United States Patent Office 3,489,575
Patented Jan. 13, 1970

3,489,575
FREEZE-VACUUM-DEHYDRATED FRIED POTATO CAKES
Karl R. Johnson and Thomas R. Schmidt, Holliston, Mass., and Gerald M. Cooper, Chicago, Ill., assignors to the United States of America as represented by the Secretary of the Army
No Drawing. Filed Jan. 6, 1967, Ser. No. 607,849
Int. Cl. A23l 1/12; A23b 7/02
U.S. Cl. 99—207        6 Claims

ABSTRACT OF THE DISCLOSURE

A freeze-vacuum-dehydrated fried potato cake capable of rapid rehydration prepared by mixing precooked potato particles with an aqueous suspension of pregelatinized corn meal to form a mixture having a total water content of from 75 to 80%, forming cakes of the mixture, frying the cakes and freeze vacuum dehydrating the fried cakes to a water content of 3% or less.

---

The invention described herein may be manufactured, used, and licensed by or for the Government for governmental purposes without the payment to us of any royalty thereon.

This invention relates to the production of freeze-vacuum-dehydrated fried potato cakes which are capable of instantaneous rehydration to provide a food product having the appearance, taste and flavor of freshly prepared fried potato cakes without need for additional heat processing.

The freeze-vacuum-dehydrated fried potato cakes in accordance with the present invention are precooked freeze-vacuum-dehydrated fried potato cakes which can be rehydrated with hot water, or even with cold water, for immediate consumption. When rehydrated with hot water, they will instantly furnish a potato cake dish having the appearance, taste and flavor of a freshly prepared fried potato cake, without need for additional heat processing.

Insofar as we are aware there are not now on the market or otherwise available to military and civilian consumers, dehydrated potato cakes capable of instantaneous rehydration and immediate consumption. The present invention enables the provision of dehydrated fried potato cakes which can be rehydrated in a field mess or by the individual soldier simply by the addition of hot water, and within a few (say about 30–60) seconds can be reconstituted to an appetizing, tasty and nourishing dish. This is obviously very important, particularly for the Armed Forces, in that a dehydrated food product that is lacking in quick reconstitution properies and/or that falls short of the appearance and flavor of an ordinary freshly prepared popular food dish, will not be accepted by the soldier in the field, and will in all probability be discarded by the soldier. Such a result would be wasteful from the logistical standpoint, as the production cost of the item and its transportation to a forward area in some distant part of the world would be unproductive, and the soldier would suffer nutritionally for lack of an important part of his ration.

Similar advantages of an acceptable dehydrated food item, and corresponding disadvantages of a dehydrate food item which falls short of complete acceptability, exist in the civilian food marketing system.

Accordingly, it is a principal object of our invention to provide freeze-vacuum-dehydrated precooked potato cake products which will closely resemble the original cooked products after rehydration, particularly in taste and texture.

Another object of our invention is to provide freeze-vacuum-dehydrate precooked potato cake products which will rehydrate instantaneously or nearly instantaneously in hot water.

A further object is the provision of freeze-vacuum-dehydrated precooked potato cake products with the characteristic crust of fried products maintained after rehydration.

Still another object is the production of freeze-vacuum-dehydrated precooked potato cake products which, when properly protected from oxygen and moisture in storage, will maintain their consumer acceptability under adverse storage conditions.

An advantage of our invention is that our freeze-vacuum-dehydrated precooked potato cake products can be produced from commonly available raw materials and with conventional food machinery, without need for special retraining of operators.

A further military advantage of our invention, which is also of applicability in the civilian field (e.g., camping and scouting), is that the freeze-vacuum-dehydrated precooked potato cake products of our invention can be rehydrated with cold water or even eaten dry, although such a mode of consumption is, of course, less palatable than in the case of rehydration with hot water.

Other objects and advantages of our invention will be readily apparent from the following description taken in conjunction with the appended claims.

The potato cakes of the present invention are produced by washing, peeling, and cutting raw potatoes into particles, such as strips or other subdivisions, then cooking the potatoes in hot water (about 200 to 210° F.) for approximately five minutes, then thoroughly mixing the potato particles with an aqueous suspension of cooked comminuted corn, such as corn meal, containing seasonings, salt and any other flavoring or flavor enhancing materials desired. The aqueous suspension of corn meal is prepared by mixing water with corn meal in the ratio of from about 2.5 parts of water to 1 part of corn meal to about 3.5 parts of water to 1 part of corn meal, and heating the mixture until the corn meal is gelatinized. Larger amounts of water can be used, but in these cases the cooking must be prolonged sufficiently to evaporate the excess moisture and produce a suspension of gelatinized corn meal having the required water content to provide for the proper water content in the final mixture of potatoes and gelatinized corn meal.

The total unbound water content of the mixture of potatoes and gelatinized corn meal is critical and must not be less than about 75% and not more than about 80% of the final mixture to be molded into potato cakes prior to frying thereof. This includes the water in the potatoes as well as that added thereto in the form of the suspension of gelatinized corn meal. If the mixture contains more than about 80% water, it tends to puff up unduly during frying. If it contains less than about 75% water, it tends to crumple during frying and the final product will crumble to an even greater extent and, therefore, will be unsatisfactory as a potato cake.

The unbound water content of the mixture of potatoes and gelatinized corn meal may be determined empirically by examination of the product after frying with regard to its tendency to crumble or significant puffing. The water content may also be determined by measuring the weight loss of the mixture during drying for sixteen hours in a vacuum oven at a pressure not exceeding 100 mm. of mercury at 70° C. This latter method is equally applicable to determine moisture content of the corn meal suspension or any of the ingredients or other intermediate measures in the process as well as of the final freeze dehydrated product.

The proportion of corn meal solids in the mixture of potatoes and gelatinized corn meal is preferably at least about 6% of the total mixture in order to bind the mixture together adequately. Up to about 12% corn meal can be employed if desired, but in general more than the preferred proportion of about 7% corn meal will not be required in order to produce satisfactory final freeze-vacuum-dehydrated potato cakes. The water content of the aqueous suspension of gelatinized corn meal may be varied within the limits described above such that when the proper amount of suspension is added to the cooked and drained potatoes and the various flavoring ingredients, it will bring the water content of the mixture within the above-stated critical range of 75% to 80% of the total mixture and the corn meal solids content to at least 6% of the total mixture. The condiments, flavoring agents and flavor enhancing agents may be varied without appreciably affecting the texture or acceptability of the product. It has been found that highly acceptable potato cakes will usually have about 3% of the total weight prior to dehydration as condiments, flavoring agents, and flavor enhancing agents. In general, the major proportion of solids in the mixture from which the freeze-vacuum-dehydrated potato cakes are prepared will be potato solids. However, as mentioned above, an appreciable portion of the solids will be obtained from corn. When the proportion of corn is increased, the proportion of potato is decreased. The ratio of cooked potatoes to commercial corn meal will generally be from about 12:1 to about 4:1 while maintaining the water content in the total mixture within the above-stated critical range.

The mixture of ingredients is formed by machine or by hand into cakes of the shape and size desired and fried in deep fat at approximately 375° to 400° F. until the surfaces of the cakes develop a golden brown color. The fried potato cakes are drained free of excess fat and freeze-vacuum-dehydrated to a water content below 3% (preferably about 2 to 3%) in accordance with techniques well understood in the art, and finally, are packaged and hermetically sealed in the absence of oxygen (under vacuum, or in an inert gas atmosphere, such as nitrogen or carbon dioxide). The resulting product is quite storage-stable and rehydratable with hot water within a few seconds to the likeness of a freshly fried potato cake, without further cooking or frying. Water instantaneously penetrates evenly through the crust and the underlying dehydrated component of the cake. Thus, the potato cakes of the invention are ready-to-eat components of meals designed to be consumed without cooking and without any preparation required other than the time required to heat some water and the few seconds required for rehydration of the meal components by the hot water.

We will now proceed to disclose a specific example of the production of dehydrated potato cakes in accordance with the above-described principles. It will be understood, of course, that the above-enumerated and other advantages of our invention may also be accomplished by suitable variations of the detailed method steps, about to be set forth below, which are intended to be for illustrative purposes, and not for the purpose of limiting the scope of our invention.

EXAMPLE

Raw U.S. #1 grade Idaho Russet potatoes are washed, peeled, cut into strips with cross-sectional dimensions of ¼" and cooked for 5 minutes in water at 200° to 210° F. The cooked potatoes are then drained and cooled on a screen (U.S. #8 mesh) for not less than 15 minutes at room temperature and a relative humidity of about 30 to 40% to substantially eliminate surface water therefrom.

Seven parts by weight of commercial grade of degerminated corn meal having an initial water content of about 12% by weight are dispersed in 21 parts by weight of water and the following flavor ingredients are added: 1.25 parts of salt, 0.08 part of white pepper, 0.50 part of minced, dehydrated onion, 1.00 part of shortening, and 0.10 part of monosodium glutamate. The slurry of corn meal and flavoring ingredients is heated until the corn meal has completely gelatinized (approximately 185° F.), forming a suspension of the corn meal. Then 69.07 parts by weight of drained, cooked potatoes are added to the corn meal suspension and the mixture is thoroughly mixed in a food mixer. The resulting mixture is formed by hand or by machine into cakes approximately 3¾-inch x 2½-inch x ¾-inch in dimensions. These cakes are fried in deep fat at 375° to 400° F. until the surfaces thereof develop a golden brown color. This usually requires approximately 3 minutes cooking time. The cakes are then drained free of excess fat, cooled, and then freeze-vacuum dehydrated by procedures generally known in the art wherein the frozen moisture (ice) is removed by sublimation.

Recommended freeze drying conditions for cakes on trays placed on heated platens of a conventional vacuum-freeze dryer are a vacuum of about 0.5 to 1.5 mm. (say about 0.75–1.00 mm.) of mercury absolute, a platen temperature varied during the dehydration cycle beginning at about 130° F. and being reduced to a temperature below 125° F. by the end of the cycle, and a dehydration time of approximately 12 hours. The platen is heated by circulating a heating fluid through tubes therein. In an alternate drying procedure, the potato cakes are placed on suspended trays between radiant heating plates at a plate temperature of 160° F. under the same vacuum conditions as above, and for a dehydration time of about 5 to 6 hours. The water content of the dehydrated product is below 3%, and may be as low as a trace; about 2 to 3% water content is presently considered most desirable for good storage stability and about 2.5% water content is preferred.

If it is intended to store the dehydrated potato cakes over an extended period of time, they should be packed in the absence of atmospheric oxygen, e.g., canned with a high vacuum (say of the order of about 26–27 inches of mercury) or in the presence of an inert gas, such as carbon dioxide or (preferably) nitrogen. In lieu of a can, flexible plastic waterproof hermetically heat-sealable pouches, e.g., of polyethylene terephthalate film may be employed, with the exclusion of atmospheric oxygen. Samples of the potato cakes produced in accordance with this example and stored in the absence of oxygen at semi-tropical temperatures of the order of 100° F. for 6 months have been found completely acceptable in appearance, texture, and flavor, after rehydration.

While we have described an example of our process using U.S. #1 grade Idaho Russet potatoes, other varieties and grades of potatoes may be used to equal advantage. We have, for example, found that Katahdin, White Rose or Irish Cobbler potatoes may be substituted for the Idaho Russet potatoes in the example described and that U.S. #2 grade potatoes in all four varieties may be used.

As heretofore indicated, rehydration is virtually instantaneous upon addition of hot water (e.g., about 170° to 212° F.), which can be done in a sauce pan or canteen cup, if desired. The hot water can be obtained by the individual soldier by the use of ordinary heat tablets (e.g., trioxane tablets) even under front line combat condition. Rehydration time is a matter of seconds, say about 30 to 60 seconds, for a dehydrated potato cake of the thickness of the above example. The potato cake can be eaten after rehydration for shorter periods of time or without any rehydration other than that which would occur in the mouth during mastication. However, for optimal restoration of the characteristics of a freshly prepared fried potato cake, a cake of the thickness of that of the above example should be rehydrated, as indicated, for about 30 to 60 seconds and then the excess, unabsorbed water should be poured off so that the potato cake will not become soggy. Thinner cakes will require proportionately shorter rehydration times and thicker cakes will require proportionately longer rehydration times.

While the foregoing example discloses the use of degerminated corn meal as a component of the potato cakes, it is feasible to substitute therefor an approximately equal proportion of pregelatinized corn flour without precooking the slurry or suspension thereof to gelatinize the corn.

While the foregoing general description of our invention and the recited example use the term "potato cake," it will be understood that the latter term is used in a general sense and encompasses a number of geometrical configurations, such as discs (patties), spheres (balls), or other suitable shapes.

Throughout this specification and the claims, percentages or parts are by weight.

It will be seen that we have provided a simple and highly efficient method of providing instantly rehydratable freeze-vacuum-dehydrated fried potato cakes. The resulting products are highly palatable and useful in rations and can be prepared for eating even under rugged field conditions, so long as some water (preferably hot) is available. They also may be eaten dry.

It will be understood that various changes in the details, materials, and conditions used in preparing the food products of this invention, which have been herein described in order to explain the nature of the invention, may be made by those skilled in the art within the principle and scope of the invention as expressed in the appended claims.

We claim:

1. Process of making dehydrated potato cakes comprising, uniformly mixing precooked potato particles with a suspension of comminuted and gelatinized corn in water to form a mixture comprising at least about 6 percent gelatinized corn and having a total water content of not less than about 75% and not more than about 80%, forming said mixture into cakes, frying said cakes to form a porous crust thereon, and freeze-vacuum-dehydrating said fried cakes to a water content below about 3 percent; whereby instantly rehydratable storage-stable shape-sustaining dehydrated potato cakes are obtained, which upon rehydration have the appearance, texture and flavor of freshly prepared potato cakes.

2. Process according to claim 1, wherein said mixture comprises from about 6 percent to about 12 percent gelatinized corn.

3. Process according to claim 1, wherein said potato cakes are deep fat fried prior to freeze-vacuum-dehydration.

4. Process according to claim 1, wherein said potato cakes are dehydrated to a moisture content not exceeding about 2.5 percent.

5. Process according to claim 1, wherein said dehydrated potato cakes are packaged in the absence of atmospheric oxygen.

6. Process according to claim 1, wherein said potato particles are precooked by treating said particles with water at from about 200° F. to about 210° F. for about five minutes.

References Cited

UNITED STATES PATENTS

| 3,150,985 | 9/1964 | Buscemi et al. | 99—208 |
| 3,309,207 | 3/1967 | Tuomy et al. | 99—207 |

OTHER REFERENCES

Talburt and Smith, Potato Processing Air Publishing Company, 1959, Westport, Conn., pp. 301–305.

A. LOUIS MONACELL, Primary Examiner

W. A. SIMONS, Assistant Examiner

U.S. Cl. X.R.

99—100, 171